United States Patent [19]

Loucks

[11] Patent Number: 5,131,438

[45] Date of Patent: Jul. 21, 1992

[54] METHOD AND APPARATUS FOR UNMANNED AIRCRAFT IN FLIGHT REFUELING

[75] Inventor: Kenneth W. Loucks, Greenville, Tex.

[73] Assignee: E-Systems, Inc., Greenville, Tex.

[21] Appl. No.: 569,713

[22] Filed: Aug. 20, 1990

[51] Int. Cl.⁵ .............................................. B64D 39/00
[52] U.S. Cl. ........................................ 141/1; 141/387; 141/279; 244/135 A
[58] Field of Search ........................ 141/1, 94, 95, 279, 141/387 X, 388; 244/135 A, 161; 137/355.17, 899.2, 355.16, 355.2

[56] References Cited

U.S. PATENT DOCUMENTS

| | | | |
|---|---|---|---|
| H,297 | 7/1987 | Schultz | 141/232 |
| 2,023,310 | 12/1935 | Cobham | 244/135 A |
| 2,261,598 | 11/1941 | Tyson | 244/135 A |
| 2,443,276 | 6/1948 | Seevers . | |
| 2,443,276 | 6/1943 | Seevers | 244/135 A |
| 2,582,609 | 1/1952 | Steele | 244/135 A |
| 2,774,547 | 12/1956 | Latimer-Needham et al. . | |
| 2,823,881 | 2/1958 | Patterson . | |
| 2,941,761 | 6/1960 | Cox et al. . | |
| 2,950,884 | 8/1960 | Cicala et al. . | |
| 3,067,972 | 12/1962 | Mosher | 244/135 X |
| 3,091,419 | 5/1963 | Mosher . | |
| 3,285,544 | 11/1966 | Chope et al. | 244/135 A |
| 4,095,761 | 6/1978 | Anderson et al. | 244/135 A |
| 4,158,885 | 6/1979 | Neuberger | 244/135 A X |
| 4,905,938 | 3/1990 | Braccio et al. | 244/135 A X |
| 4,964,598 | 10/1990 | Berejik et al. | 244/190 |

FOREIGN PATENT DOCUMENTS 541505 10/1955 Belgium ..................... 244/135 A

Primary Examiner—William A. Cuchlinski, Jr.
Assistant Examiner—G. Bradley Bennett
Attorney, Agent, or Firm—Harold E. Meier

[57] ABSTRACT

A method and apparatus for in-flight refueling of unmanned aircraft includes a manned tanker aircraft having a refueling probe mounted thereon. The probe is extendable for increased visual reference. A drogue mounted on the distal end of a flexible refueling hose is trailed from the unmanned aircraft. The refueling hose is stored on a reel assembly mounted on the fuel tank of unmanned aircarft. The reel assembly is remotely actuated from the manned tanker to pay out the refueling hose. A homing system transmits signals from the manned aircraft guiding the drogue to the probe. Upon insertion of the probe into the drogue, automatic coupling occurs and the unmanned aircraft is refueled.

18 Claims, 3 Drawing Sheets

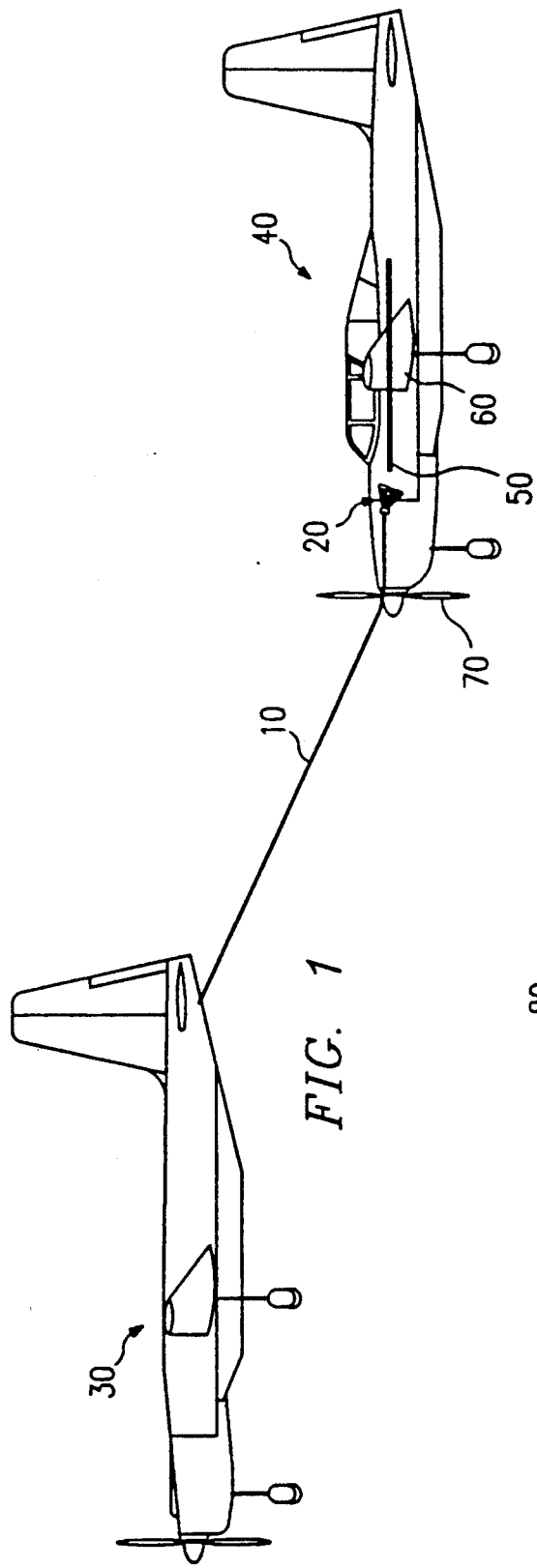
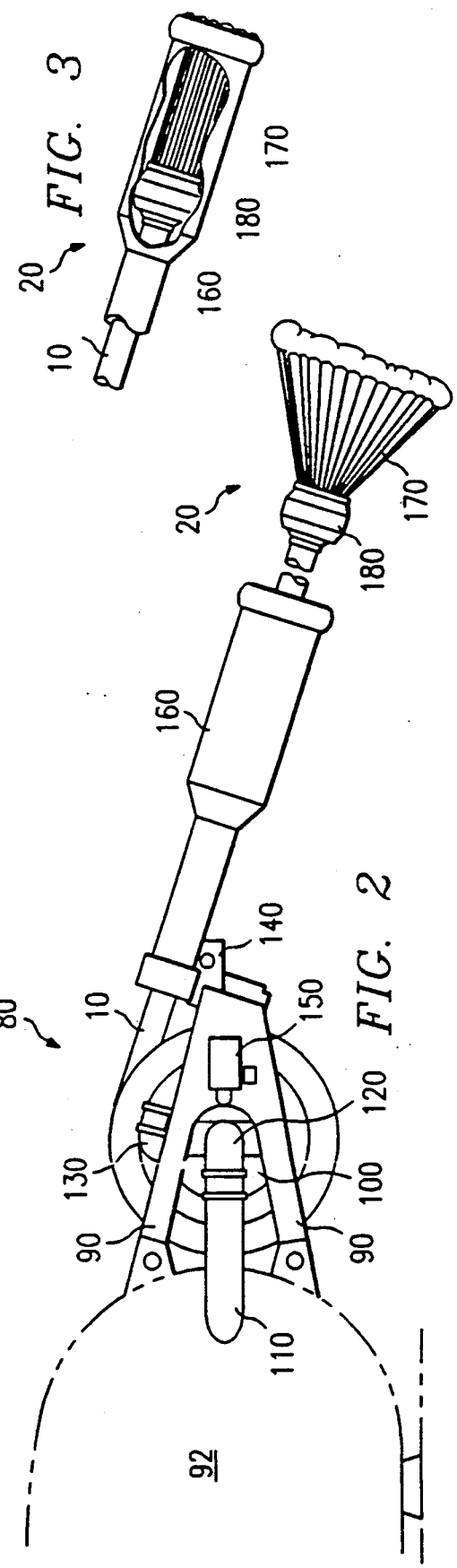

METHOD AND APPARATUS FOR UNMANNED AIRCRAFT IN FLIGHT REFUELING

TECHNICAL FIELD

The present invention relates generally to in-flight refueling of unmanned aircraft, and more particularly to a method and apparatus for in-flight refueling of unmanned aircraft where a manned tanker performs the homing and probe-drogue connecting maneuvers necessary for in-flight refueling of the unmanned aircraft.

BACKGROUND OF THE INVENTION

In-flight refueling of manned aircraft using the probe-and-drogue fuel transfer system is currently in use by military organizations around the world. In these conventional systems, a conical paradrogue assembly is trailed on the end of a length of hose from the tanker aircraft and a probe is mounted on the receiver aircraft. The receiver aircraft, under control by its pilot, approaches from the tanker's rear and flies the probe into the conical paradrogue where automatic coupling and refueling take place. The simplicity of this system is readily apparent since no operator is required on the tanker and there are no automated systems required to effect rendezvous nor to guide the probe into the very small target presented by the paradrogue. Difficulties in applying this method to an unmanned aircraft receiver are also readily apparent since complex and costly automated systems would be required to perform the intricate and complicated functions otherwise performed by the pilot. For these reasons, in-flight refueling of unmanned aircraft is currently not practical, and has not been operationally implemented.

This invention eliminates the problems delineated above by providing the means whereby the pilot of the manned tanker performs the rendezvous and probe-drogue connection process thus eliminating the need for complex automated systems that would otherwise be required if the unmanned aircraft were required to perform this function. The advantage of the application of this invention would be a practical inflight-refuelable unmanned aircraft having significantly less cost, size, and complexity than currently envisioned long-endurance unmanned vehicles using conventional probe-drogue refueling systems.

SUMMARY OF THE INVENTION

The present invention overcomes the above and other problems associated with in-flight refueling of unmanned aircraft by equipping the unmanned receiving aircraft and manned tanker with apparatus whereby the manned tanker performs the rendezvous and connecting maneuvers, thereby eliminating the need for costly complex automated systems on board the unmanned aircraft.

The method and apparatus of the present invention comprise an automatic homing drogue, utilizing an H-field magnetic communications link, mounted on a length of refueling hose trailed from the unmanned aircraft. A homing transmitter is installed on a probe mounted on the manned tanker. Pay out and retraction of the refueling hose is remotely controlled from the tanker using the homing transmitter on the probe. Responses to signal changes from the homing transmitter of the probe cause the drogue to fly in the direction of the probe mounted on the approaching tanker. The probe is mechanically extendable forward for increased visual reference and engagement with the trailing drogue.

Use of the method and apparatus of the present invention for in-flight refueling of unmanned aircraft minimizes the need for costly complex automated systems in the unmanned aircraft, thereby reducing the size, cost, and complexity of refueling apparatus and allowing unmanned aircraft to remain airborne for longer periods of time, in turn resulting in a reduction in the total number of unmanned aircraft, ground support personnel and equipment needed for tactical operations.

DESCRIPTION OF THE DRAWINGS

A more complete understanding of the invention may be had by reference to the following Detailed Description when taken in conjunction with the accompanying Drawings, wherein:

FIG. 1 is an illustration of in-flight refueling of an unmanned aircraft incorporating the invention;

FIG. 2 is an enlarged side view of the drogue and reel assembly for storage of the refueling hose, showing the refueling hose of FIG. 1 in a stored position;

FIG. 3 is an enlarged view of the end of the refueling hose of FIG. 2 with certain parts broken away to illustrate the drogue in a stored position;

DETAILED DESCRIPTION

Figure 8:
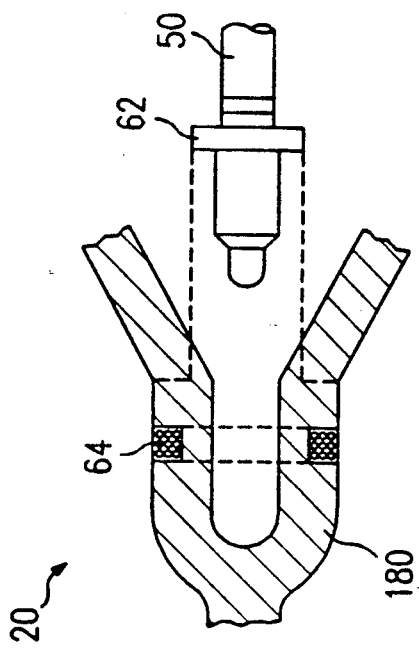
FIG. 8 is an enlarged partial view of the probe of FIG. 1 and partial section view of the drogue of FIG. 6.

Referring now to the Drawings, and particularly FIG. 1, there is shown in-flight refueling of a long flight duration unmanned aircraft incorporating the preferred embodiment of the present invention. A flexible refueling hose 10 having a drogue 20 mounted on the trailing end thereof is extended from the unmanned receiving aircraft 30. As illustrated in FIG. 8, the drogue 20 is directed to a refueling probe 50 mounted on the wing 60 of the manned tanker 40 through use of a homing transmitting coil 62 mounted on the probe and a homing receiving coil 64 installed within the drogue.

Figure 7:
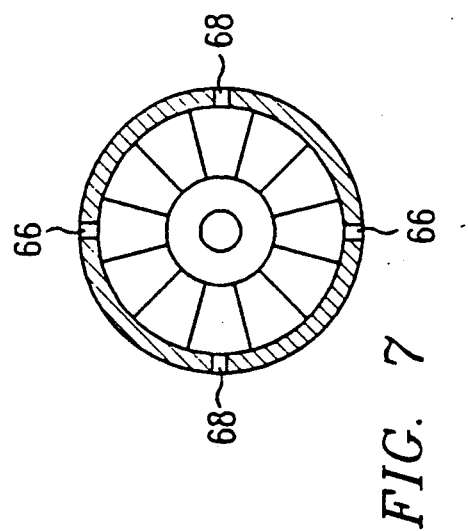
FIG. 7 is a section view of the drogue of FIG. 6.
Figure 6:
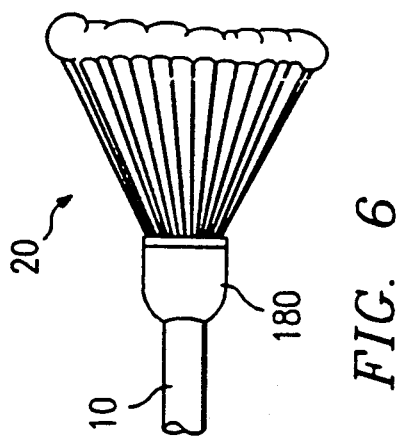
FIG. 6 is an enlarged side view of the drogue of FIG. 2.

Referring now to FIGS. 6, 7, and 8, the homing transmitting coil 62 and homing receiving coil 64 are preferably of the type utilizing an H-field magnetic communications link as the homing signal. The drogue 20 is further equipped with "X" axis control vanes 66 and "Y" axis control vanes 68 connected to the receiving coil and located in the distal end of the drogue to allow vertical and horizontal flight control of the drogue.

The manned aircraft 40 is maneuvered to position the refueling probe 50 for insertion of the probe into the drogue 20. Upon insertion of the probe 50 into the drogue 20, automatic coupling occurs and the refueling process begins.

Referring again to FIG. 1, in the event the manned tanker is a propeller driven aircraft, the refueling probe 50 is mounted on the wing 60 of the manned tanker 40, or other suitable aircraft structure of the manned tanker 40, to avoid interference between the propeller 70 of the manned tanker with the flexible refueling hose 10. For improved visual reference while maneuvering the probe 50 into position for insertion into the drogue 20, the probe is forwardly extendable by the pilot of the manned tanker through use of conventional electrical motor and screwdrive assembly (not shown).

Referring now to FIG. 2, prior to and upon completion of the refueling process, the flexible refueling hose 10 having the drogue 20 mounted on the trailing end thereof is stored in a retracted position. The refueling hose 10 is wound for storage on a reel assembly 80. A frame 90 of the reel assembly 80 is mounted to the fuel tank 92 or other suitable aircraft structure of the unmanned receiving aircraft 30 and includes a drum 100 around which the refueling hose 20 is wound for storage.

An outlet pipe 110 is connected to the fuel tank 92 of the unmanned receiving aircraft 30. A fuel outlet elbow 120 is mounted on the distal end of the fuel outlet pipe 110 connecting the fuel outlet pipe to the reel assembly 80. At the reel assembly 80, the fuel outlet elbow 120 is connected through an appropriate coupling to a fuel hose connector elbow 130. The refueling hose 10 is attached to the fuel hose connector elbow 130, thereby anchoring one end of the refueling hose to the reel assembly 80. As fuel flows through the refueling hose 10 from the manned tanker 40, it passes through the fuel hose connector elbow 130 into the fuel outlet elbow 120 and through the fuel outlet pipe 110 into the fuel tank of the unmanned receiving aircraft 30.

A level winding serving gear 140 is mounted on the distal end of the frame 90 to ensure that the refueling hose 10 is evenly wound on the drum 100 of the reel assembly 80. The level winding serving gear 140 also ensures smooth pay out of the refueling hose 10.

Electrical control wires in the refueling hose connect the homing receiving coil 64 to a reel booster and lock assembly 150 mounted on the distal end of the reel frame 90 for remote actuation from the homing transmitting coil 62 mounted on the refueling probe 50 of the manned tanker 40 to pay out the refueling hose 10. The reel booster and lock assembly 150 is also actuated to rewind and secure the hose in a stored and locked position on the reel assembly 80 upon completion of the refueling process.

Referring now to FIGS. 2 and 3, a drogue storage tube 160 is mounted on the distal end of the refueling hose 10. The flexible refueling hose 10 extends through the drogue storage tube 160 and is connected to a parachute shaped paradrogue 170 through a fuel coupling 180. When the refueling hose 10 is stored in a wound position on the drum 100 of the reel assembly 80, the paradrogue 170 is stored in a folded position within the drogue storage tube 160. As the refueling hose 10 is paid out to begin the refueling process, the paradrogue 170 is forced from the drogue storage tube 160. The paradrogue 170 expands and operates in the manner of a parachute to create drag for pay out of the refueling hose 10.

Figure 4:
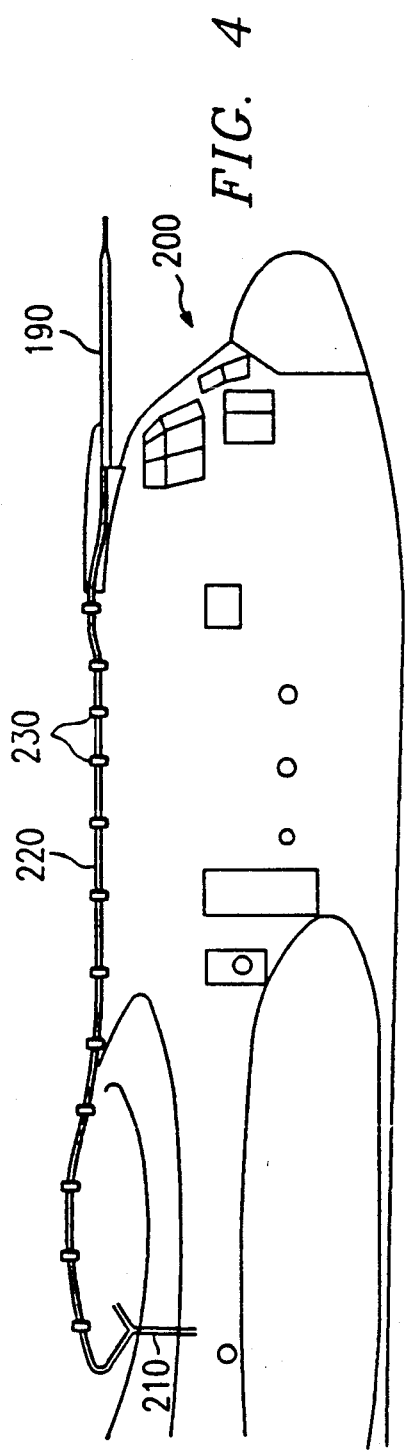
FIG. 4 is a partial side view of a manned tanker illustrating the invention having the probe mounted on the brow of a C-130 aircraft.

Referring now to FIG. 4, there is shown an embodiment of the invention where a probe 190 is mounted on the brow of a C-130 manned tanker aircraft 200. The probe 190 is connected to a conventional refuel/defuel line 210 through a converter hose 220 securely mounted by suitable fasteners 230 to the spine of the tanker 200. The probe 190 is mechanically extendable by the pilot, through use of conventional electrical motor and screw-drive assembly (not shown), for increased visual reference during the coupling maneuvers.

Figure 5:
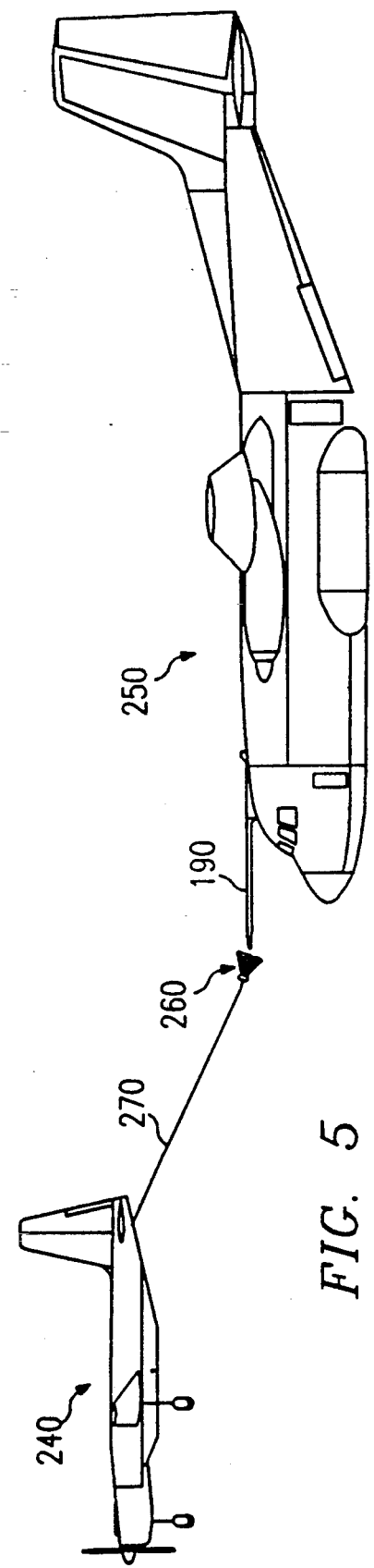
FIG. 5 is an illustration of in-flight refueling of unmanned aircraft where the probe is mounted on the brow of a C-160 aircraft.

FIG. 5 illustrates in-flight refueling of a long flight duration unmanned receiving aircraft 240 through use of the embodiment of the invention where the probe 190 is mounted on the brow of a C-160. manned tanker aircraft 250. The probe 190 is mechanically extendable by the pilot for improved visual reference of the pilot while maneuvering the probe for insertion into a drogue 260 mounted on the distal end of a refueling hose 270 trailed from the long flight duration unmanned receiving aircraft 240.

As in the embodiment of the invention illustrated in FIG. 1, a reel booster and lock assembly (not shown) having a receiving coil (not shown) is remotely actuated from the manned tanker 250 to automatically pay out the refueling hose 270. A homing transmitting coil (not shown) mounted on the refueling probe 190 of the manned tanker 250 signals an automatic homing receiving coil (not shown) in the drogue 260, utilizing an H-field magnetic communications link, to fly the drogue to the probe for refueling the unmanned aircraft.

In-flight refueling of unmanned aircraft can therefore be accomplished utilizing the method and apparatus of the present invention without incurring the cost of complex automated systems in the unmanned receiving aircraft. Inflight refueling in accordance with the present invention reduces the size, cost, and complexity of refueling apparatus and associated homing systems and allows long flight duration unmanned aircraft to remain airborne for long periods of time. Thus, tactical operations may be accomplished with fewer aircraft, less ground support personnel, and less equipment, thereby reducing the total cost of tactical operations involving long duration flight of unmanned aircraft.

Although the preferred embodiments of the present invention have been illustrated in the accompanying Drawings and described in the foregoing Detailed Description, it will be appreciated by those skilled in the art that various modifications and rearrangements of the component parts and elements of the present invention are possible within the scope of the present invention.

I claim:

1. Apparatus for in-flight refueling of long range unmanned aircraft by a tanker aircraft comprising:
   refueling hose extendable and trailed from and retractable into the unmanned aircraft;
   first means mounted in the unmanned aircraft and controlled from the tanker aircraft for remotely extending, retracting, and storing the refueling hose;
   transmitting means mounted on the tanker aircraft;
   receiver means mounted on the unmanned aircraft for receiving signals from said transmitting means and actuating the first means for extending or retracting the refueling hose in accordance with the received signal;
   a drogue mounted on the trailing end of the refueling hose and;
   a probe mounted on the tanker aircraft for insertion into the drogue.

2. Apparatus for in-flight refueling of claim 1 wherein the probe is mounted on the wing of the tanker aircraft.

3. Apparatus for in-flight refueling of claim 1 wherein the probe is forwardly extendable.

4. Apparatus for in-flight refueling of claim 1 wherein the probe is mounted on the brow of the tanker aircraft.

5. Apparatus for in-flight refueling of unmanned aircraft by a tanker aircraft comprising:
    refueling hose extendable and trailed from and retractable into the unmanned aircraft;
    a drogue mounted on the trailing end of the refueling hose;
    remotely controlled means mounted in the unmanned aircraft and controlled from the tanker aircraft for extending and retracting the refueling hose;
    means, located on the tanker aircraft, for remote actuation of the remotely controlled means for extending and retracting the refueling hose;
    homing means attached to the drogue for remote directional flight control of the drogue; and
    a probe mounted on the tanker aircraft for insertion into the drogue and automatic coupling therewith.

6. Apparatus for in-flight refueling of claim 5 wherein the means for remote actuation of the remotely controlled means for extending and retracting the refueling hose, comprises:
    reel booster and lock means mounted on the remotely controlled means for automatically rotating or locking the remotely controlled means in position for extending, retracting or storage of the refueling hose;
    transmitting means mounted on the tanker aircraft;
    receiving means mounted in the unmanned aircraft for receiving transmissions from said transmitting means; and
    means connecting the receiving means to the reel booster and lock means for actuation of said reel booster and lock means to rotate or lock into position the remotely controlled means.

7. Apparatus for in-flight refueling of claim 5, wherein the homing means comprises:
    transmitting means mounted on the tanker aircraft;
    receiving means mounted in the unmanned aircraft for receiving homing transmissions from said transmitting means; and
    control vanes mounted in the drogue for horizontal and vertical flight control of the drogue in accordance with the homing signals received by said receiving means.

8. The in-flight refueling apparatus of claim 5 wherein the probe is mounted on the wing of the tanker aircraft.

9. The in-flight refueling apparatus of claim 5 wherein the probe is mounted on the brow of the tanker aircraft.

10. The in-flight refueling apparatus of claim 5 wherein the probe is extendable for increased visual reference.

11. A method for in-flight refueling of an unmanned aircraft from a tanker aircraft, comprising the steps of:
    remote deployment and retraction from the unmanned aircraft a refueling hose having a drogue mounted to the distal end thereof; and
    inserting a probe mounted on the tanker aircraft into the drogue.

12. The method for in-flight refueling of claim 11 where the step for remote deployment of the refueling hose further comprises steps for:
    transmitting signals from transmitting means mounted on the manned tanker aircraft;
    receiving signals by receiving means mounted in the unmanned aircraft; and
    actuating a reel means electrically connected to said receiving means in accordance with the signals received by said receiving means to pay out, rewind, or store the refueling hose.

13. The method for in-flight refueling of claim 11, further comprising the step of remotely controlling the flight direction of the drogue, said step including:
    transmitting homing signals from the tanker aircraft;
    receiving said homing signals by the unmanned aircraft; and
    actuating control vanes in accordance with the homing signals received by said unmanned aircraft to control horizontal and vertical flight of the drogue.

14. The method for in-flight refueling of claim 11, further comprising the step of extending the probe for increased visual reference.

15. The method for in-flight refueling of claim 11, where the step of remote deployment and retraction of the refueling hose further comprises:
    transmitting signals from the tanker;
    receiving signals by the unmanned aircraft; and
    actuating reel means in accordance with the received signals to pay out, rewind, or store the refueling hose.

16. A method for in-flight refueling of claim 11, including the step of remotely controlling the flight direction of the drogue comprising:
    transmitting homing signals from the tanker;
    receiving said homing signals by the unmanned aircraft; and
    actuating control vanes in the drogue in accordance with the homing signals received by said unmanned aircraft to control horizontal and vertical flight of the drogue.

17. The method for in-flight refueling of claim 11, further comprising the step of extending the probe for increased visual reference.

18. Apparatus for in-flight refueling of long-range unmanned aircraft comprising:
    refueling hose extendable and trailed from and retracted into the aircraft;
    a remotely controlled drogue mounted on the trailing end of the refueling hose;
    a probe mounted on a tanker aircraft for insertion into the drogue;
    homing signal transmitting means mounted on the tanker aircraft;
    homing signal receiving means mounted in the unmanned aircraft for receiving homing transmissions from said transmitting means to establish a communication link between the transmitting means and receiving means; and
    control vanes mounted on the drogue positionable in accordance with the signals received from said homing signal receiving means to control horizontal and vertical flight of the drogue.

* * * * *